United States Patent
Aigner et al.

(10) Patent No.: US 12,493,629 B2
(45) Date of Patent: Dec. 9, 2025

(54) DEVICE AND METHOD FOR ADDING EQUIPMENT DATA INTO A DISTRIBUTED DATABASE SYSTEM

(71) Applicant: Siemens Aktiengesellschaft, Munich (DE)

(72) Inventors: Tobias Aigner, Munich (DE); Markus Sauer, Munich (DE); Saurabh Narayan Singh, Bayern (DE); Nejc Zupan, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/919,005

(22) PCT Filed: Apr. 21, 2021

(86) PCT No.: PCT/EP2021/060417
§ 371 (c)(1),
(2) Date: Oct. 14, 2022

(87) PCT Pub. No.: WO2021/214155
PCT Pub. Date: Oct. 28, 2021

(65) Prior Publication Data
US 2023/0325406 A1    Oct. 12, 2023

(30) Foreign Application Priority Data
Apr. 24, 2020 (EP) .................... 20171352

(51) Int. Cl.
*G06F 16/00* (2019.01)
*G06F 16/25* (2019.01)
(Continued)

(52) U.S. Cl.
CPC ............ *G06F 16/27* (2019.01); *G06F 16/258* (2019.01); *H04L 63/0823* (2013.01)

(58) Field of Classification Search
None
See application file for complete search history.

(56) References Cited

U.S. PATENT DOCUMENTS

| | | | |
|---|---|---|---|
| 2003/0126195 A1* | 7/2003 | Reynolds | H04L 63/12 714/E11.008 |
| 2016/0087933 A1* | 3/2016 | Johnson | H04L 41/08 709/245 |

(Continued)

FOREIGN PATENT DOCUMENTS

| | | |
|---|---|---|
| CN | 106981004 A | 7/2017 |
| CN | 108701145 A | 10/2018 |

(Continued)

OTHER PUBLICATIONS

PCT International Search Report and Written Opinion of International Searching Authority mailed Jul. 14, 2021 corresponding to PCT International Application No. PCT/EP2021/060417 filed Apr. 21, 2021.

(Continued)

*Primary Examiner* — Anhtai V Tran
(74) *Attorney, Agent, or Firm* — Schmeiser, Olsen & Watts, LLP

(57) ABSTRACT

A device for adding equipment data of a piece of equipment into a distributed database system includes a first communication interface designed to receive database configuration information from the distributed database system, a second communication interface coupled to the piece of equipment and designed to receive equipment data a configuration module designed to select at least one configuration parameter for configuring a data providing module, test at least one selected configuration parameter on the basis of the database configuration information, output the test result, and configure the data providing module, an identification module designed to provide identification information, a registration (Continued)

Figure 1:
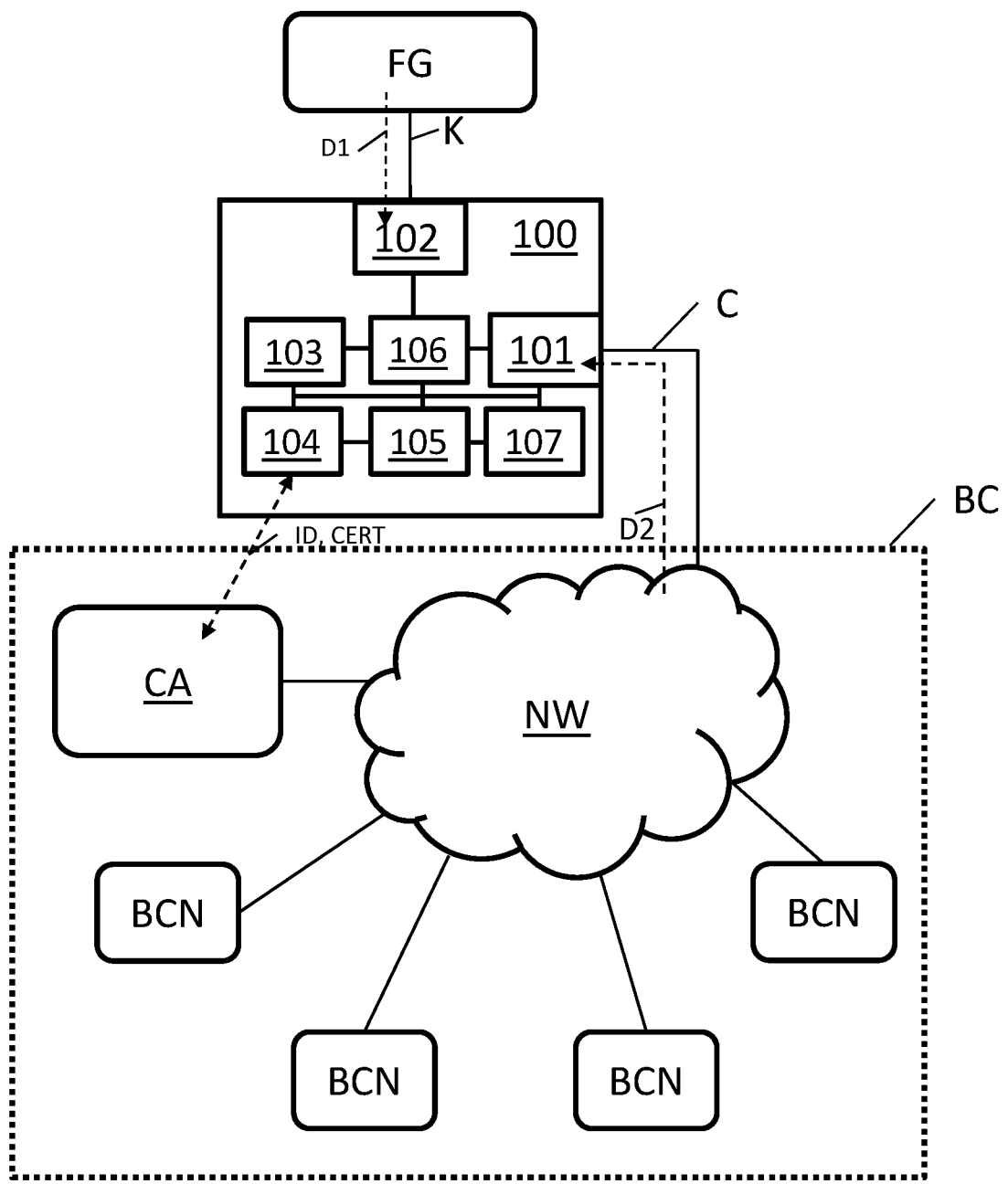

module designed to register the piece of equipment on the basis of the identification information for the distributed database system, and a data providing module designed to add the equipment data with respect to the identification information into the distributed database.

14 Claims, 2 Drawing Sheets

(51) Int. Cl.
  *G06F 16/27* (2019.01)
  *H04L 9/40* (2022.01)

(56) References Cited

U.S. PATENT DOCUMENTS

| | | | |
|---|---|---|---|
| 2017/0206522 A1 | 7/2017 | Schiatti et al. | |
| 2018/0287800 A1 | 10/2018 | Chapman et al. | |
| 2019/0005470 A1* | 1/2019 | Uhr | H04L 9/3239 |
| 2019/0013948 A1 | 1/2019 | Mercuri et al. | |
| 2021/0271665 A1 | 9/2021 | Jetzfellner | |

FOREIGN PATENT DOCUMENTS

| | | |
|---|---|---|
| CN | 110012015 A | 7/2019 |
| EP | 3595267 A1 | 1/2020 |

OTHER PUBLICATIONS

Liu Yaxue et al., A Blockchain-based Multi-Application Certificate System Model, Computer Engineering, vol. 46 No. 9, Sep. 9, 2020, 1000-3428( 2020) 09-0044-10, 10 pages (English Abstract).

* cited by examiner

DEVICE AND METHOD FOR ADDING EQUIPMENT DATA INTO A DISTRIBUTED DATABASE SYSTEM

CROSS-REFERENCE TO RELATED APPLICATIONS

This application claims priority to PCT Application No. PCT/EP2021/060417, having a filing date of Apr. 21, 2021, which claims priority to EP Application No. 20171352.6, having a filing date of Apr. 24, 2020, the entire contents both of which are hereby incorporated by reference.

FIELD OF TECHNOLOGY

The following relates to an apparatus and a method for inserting device data from a device into a distributed database system.

BACKGROUND

Devices, for example field devices or manufacturing devices, are being networked to one another more and more frequently, such that they can interchange data or their data can be accessed. In this case, it is desirable if the device data are made available in a distributed database, for example a blockchain. The technology of blockchains or "distributed ledgers" is currently an intensively discussed technology which may be implemented, in particular, as a distributed database system. A transaction data record (or transaction for short) protected by means of a blockchain comprises, for example, a program code/program instruction which can also be referred to as a so-called "smart contract".

However, connecting the devices to such a distributed database is generally associated with a large amount of configuration effort. In the industrial sector in particular, an individual configuration for connection to a distributed database may be very complicated on account of the large number of devices. In addition, the problem arises of there often being no physical access to these devices on account of security requirements. For connection to a distributed database, however, it may be necessary to modify the hardware of the device in order to provide computing capacities or security functions required by the distributed database system, for example.

SUMMARY

Therefore, an aspect relates to provide an easy possible way of inserting device data into a distributed database system.

According to a first aspect, embodiments of the invention relate to an apparatus for inserting device data from a device into a distributed database system, comprising:
  a first communication interface which is configured to receive database configuration information from the distributed database system,
  a second communication interface which is coupled to the device and is configured to receive device data from the device,
  a configuration module which is configured
    to select at least one configuration parameter from a set of configuration parameters stored in the configuration module for configuring a data provision module of the apparatus,
    to check the at least one selected configuration parameter on the basis of the database configuration information and to output a checking result,
    and, on the basis of the checking result, to configure the database provision module using the at least one selected configuration parameter,
  an identification module which is configured to provide identification information for the apparatus, wherein the identification information is dependent on at least some of the device data,
  a registration module which is configured to register the apparatus for the distributed database system on the basis of the identification information, and
  a data provision module which is configured, on the basis of the checking result, to insert the device data into the distributed database system with reference to the identification information.

Unless stated otherwise in the following description, the terms "carry out", "calculate", "computer-aided", "compute", "determine", "generate", "configure", "reconstruct" and the like relate to actions and/or processes and/or processing steps which change and/or generate data and/or convert the data into other data, wherein the data may be represented or may be present as physical variables, in particular.

In connection with embodiments of the invention, "computer-aided" may be understood as meaning, for example, an implementation of the method in which a processor, in particular, carries out at least one method step of the method. For example, "computer-aided" should also be understood as meaning "computer-implemented".

In connection with embodiments of the invention, a processor may be understood as meaning, for example, a machine or an electronic circuit. A processor may be, in particular, a main processor (central processing unit, CPU), a microprocessor or a microcontroller, for example an application-specific integrated circuit or a digital signal processor, possibly in combination with a storage unit for storing program instructions, etc. A processor may also be, for example, an IC (integrated circuit), in particular an FPGA (field programmable gate array) or an ASIC (application-specific integrated circuit), or a DSP (digital signal processor) or a graphics processor GPU (graphic processing unit). A processor may also be understood as meaning a virtualized processor, a virtual machine or a soft CPU. It may also be, for example, a programmable processor which is equipped with configuration steps for carrying out said method according to embodiments of the invention or is configured with configuration steps in such a manner that the programmable processor implements the features according to embodiments of the invention of the method or of the modules or of other aspects and/or partial aspects of embodiments of the invention.

In connection with embodiments of the invention, a "module" can be understood as meaning, for example, a processor and/or a storage unit for storing program code. For example, the processor is specifically configured to execute the program code such that the processor performs functions in order to implement or realize the method according to embodiments of the invention or a step of the method according to embodiments of the invention. The respective modules may also be in the form of separate or independent modules, for example. For this purpose, the corresponding modules may comprise further elements, for example. These elements are, for example, one or more interfaces (for example database interfaces, communication interfaces—for example a network interface, a WLAN interface) and/or an evaluation unit (for example a processor) and/or a storage unit. The interfaces can be used, for example, to interchange (for example receive, transmit, send or provide) data. The evaluation unit can be used to compare, check, process, assign or calculate data in a computer-aided and/or automated manner, for example. The storage unit can be used to store, retrieve or provide data in a computer-aided and/or automated manner, for example.

In connection with embodiments of the invention, "provide", in particular with respect to data and/or information, can be understood as meaning, for example, computer-aided provision. Provision is effected, for example, via an interface (for example a database interface, a network interface, an interface to a storage unit). This interface can be used, for example, to transmit and/or send and/or retrieve and/or receive corresponding data and/or information during provision. In connection with embodiments of the invention, "provide" can also be understood as meaning, for example, loading or storing, for example a transaction with corresponding data. "Provide" can also be understood as meaning, for example, transferring (or sending or transmitting) corresponding data from one node to another node of the blockchain or of the distributed database system (or the infrastructure thereof).

In connection with embodiments of the invention, a "checksum", for example a data block checksum, a data checksum, a node checksum, a transaction checksum, a concatenation checksum or the like, can be understood as meaning, for example, a cryptographic checksum or a cryptographic hash or hash value formed or calculated, in particular, by means of a cryptographic hash function over a data record and/or data and/or one or more of the transactions and/or a section of a data block (for example the block header of a block of a blockchain or a data block header of a data block of the distributed database system or only some of the transactions of a data block). A checksum may be, in particular, (a) checksum(s) or hash value(s) of a hash tree (for example Merkle tree, Patricia tree). Furthermore, it may also be understood as meaning, in particular, a digital signature or a cryptographic message authentication code. Cryptographic protection/manipulation protection for the transactions and the data (records) stored therein can be achieved on different levels of the database system, for example, using the checksums. If a high degree of security is required, for example, the checksums are generated and checked on the transaction level, for example.

In connection with embodiments of the invention, a "data block checksum" can be understood as meaning a checksum which is calculated over some or all transactions of a data block, for example. A node can then check/determine the integrity/authenticity of the corresponding part of a data block by means of the data block checksum, for example. Additionally or alternatively, the data block checksum may also have been formed, in particular, over transactions of a preceding data block/predecessor data block of the data block. In this case, the data block checksum may also be implemented, in particular, by means of a hash tree, for example a Merkle tree or a Patricia tree, wherein the data block checksum is, in particular, the root checksum of the Merkle tree or of a Patricia tree or a binary hash tree. In particular, transactions are secured by means of further checksums from the Merkle tree or Patricia tree (for example using the transaction checksums), wherein the further checksums are, in particular, leaves in the Merkle tree or Patricia tree. The data block checksum can therefore secure the transactions, for example, by forming the root checksum from the further checksums. The data block checksum may be calculated, in particular, for transactions of a particular data block of the data blocks. In particular, such a data block checksum can be included in a subsequent data block of the particular data block in order to concatenate this subsequent data block with its preceding data blocks, for example, and, in particular, to therefore make it possible to check an integrity of the distributed database system. As a result, the data block checksum can undertake the function of the concatenation checksum, for example, or can be included in the concatenation checksum. The header of a data block (for example of a new data block or of the data block for which the data block checksum was formed) can comprise the data block checksum, for example.

In connection with embodiments of the invention, a "transaction checksum" can be understood as meaning a checksum which is formed, in particular, over a transaction of a data block. In addition, a calculation of a data block checksum for a corresponding data block can be accelerated, for example, since transaction checksums which have already been calculated, for example, can be immediately used as leaves, for example of a Merkle tree, for this purpose.

In connection with embodiments of the invention, a "concatenation checksum" can be understood as meaning a checksum which indicates or references, in particular, for a respective data block of the distributed database system, the preceding data block of the distributed database system. For this purpose, a corresponding concatenation checksum is formed, in particular, for the corresponding preceding data block. A transaction checksum or the data block checksum of a data block (that is to say an existing data block of the distributed database system), for example, can be used as the concatenation checksum in order to concatenate a new data block with an (existing) data block of the distributed database system. However, it is also possible, for example, for a checksum to be formed over a header of the preceding data block or over the entire preceding data block and to be used as a concatenation checksum. This can also be calculated, for example, for a plurality of or all preceding data blocks. It is also possible, for example, to form the concatenation checksum over the header of a data block and the data block checksum. However, in embodiments a respective data block of the distributed database system may respectively comprise a concatenation checksum which has been calculated for or relates to a preceding data block, for example, ins some embodiments, the directly preceding data block, of the respective data block. It is also possible, for example, for a corresponding concatenation checksum to also be formed only over a part of the corresponding data block (for example the preceding data block). This makes it possible, for example, to implement a data block comprising an integrity-protected part and an unprotected part. It is therefore possible, for example, to implement a data block, the integrity-protected part of which is unalterable and the unprotected part of which can also be subsequently altered. In this case, integrity-protected should be understood as meaning, in particular, that an alteration of integrity-protected data can be determined by means of a checksum.

In connection with embodiments of the invention, "concatenation of the/of data blocks of a distributed database system" can be understood as meaning, for example, that data blocks each comprise information, for example a concatenation checksum, which refers to or references another data block or a plurality of other data blocks of the distributed database system.

In connection with embodiments of the invention, "insertion into the distributed database system" and the like can be understood as meaning, for example, that a transaction or the transactions or a data block with its transactions is/are transmitted to one or more nodes of a distributed database system, in particular. If these transactions are successfully validated (for example by the node(s)), for example, these transactions are concatenated, in particular as a new data block, with at least one existing data block of the distributed database system. For this purpose, the corresponding transactions are stored in a new data block, for example. In particular, this validation and/or concatenation can be carried out by a trusted node.

In connection with embodiments of the invention, a "transaction" or "transactions" can be understood as meaning, for example, a smart contract, a data structure or a transaction data record respectively comprising one of the transactions or a plurality of transactions, in particular. In connection with embodiments of the invention, a "transaction" or "transactions" can also be understood as meaning, for example, the data relating to a transaction of a data block of a blockchain.

A transaction may comprise, in particular, a program instruction which implements a smart contract, for example. Alternatively, a transaction may be, for example, a data structure which stores data (for example the control instructions and/or contract data and/or other data such as video data, user data, measurement data etc.). In connection with embodiments of the invention, a "transaction" can also be or be referred to as a message or a communication message, for example, wherein the message comprises, for example, control instructions for controlling the devices and/or also comprises prerequisites (for example predefined requirements) for executing the control instructions.

In particular, "storage of transactions in data blocks", "storage of transactions" and the like can be understood as meaning direct storage or indirect storage. In this case, direct storage can be understood as meaning, for example, that the corresponding data block of the distributed database system or the corresponding transaction of the distributed database system comprises the respective data. In this case, indirect storage can be understood as meaning, for example, that the corresponding data block or the corresponding transaction comprises a checksum and optionally an additional data record (for example a reference to or an indication of a storage location) for corresponding data and the corresponding data are therefore not directly stored in the data block (or the transaction) (that is to say instead only a checksum for said data). In particular, these checksums can be validated, for example, when storing transactions in data blocks, as is explained, for example, under "insertion into the distributed database system".

In connection with embodiments of the invention, a "program code" (for example a smart contract) can be understood as meaning, for example, a program instruction or a plurality of program instructions stored, in particular, in one or more transactions. The program code can be executed, in particular, and is executed, for example, by the distributed database system. The program code may be executed by the infrastructure of the distributed database system in embodiments. In connection with embodiments of the invention, a "smart contract" can be understood as meaning, for example, an executable program code/program instruction. In embodiments, the smart contract may be stored in a transaction of a distributed database system (for example a blockchain), for example in a data block of the distributed database system.

In connection with embodiments of the invention, a "distributed database system", which can also be referred to as a distributed database for example, can be understood as meaning, for example, a decentralized database, a blockchain, distributed ledger, a distributed storage system, a distributed ledger technology (DLT) based system (DLTS), an audit-proof database system, a cloud, a cloud service, a blockchain in a cloud or a peer-to-peer database. It is also possible to use, for example, different implementations of a blockchain or of a DLTS, for example a blockchain or a DLTS which by means of a directed acyclic graph (DAG), a cryptographic puzzle, a hash graph or a combination of the implementation variants mentioned. Different consensus methods (consensus algorithms) can also be implemented, for example. This may be, for example, a consensus method using a cryptographic puzzle, gossip about gossip, virtual voting or a combination of the methods mentioned (for example gossip about gossip combined with virtual voting). If a blockchain is used, for example, it can be implemented, in particular, by means of a bitcoin-based implementation or an Ethereum-based implementation. A "distributed database system" can also be understood as meaning, for example, a distributed database system, at least some of the nodes and/or devices and/or infrastructure of which are implemented by means of a cloud. For example, the corresponding components are implemented as nodes in the cloud (for example as a virtual node in a virtual machine).

A distributed database system may also be, for example, a distributed communication system for interchanging data. This may be a network or a peer-to-peer network, for example.

In connection with embodiments of the invention, a "data block", which can also be referred to as an "element" or "block" depending on the context and implementation in particular, can be understood as meaning, for example, a data block of a distributed database system (for example a blockchain or a peer-to-peer database) which is implemented as a data structure, in particular, and for example, may respectively comprise one of the transactions or a plurality of the transactions. In one implementation, the database (or the database system) may be, for example, a DLT-based system (DLTS) or a blockchain and a data block may be a block of the blockchain or of the DLTS. A data block may comprise, for example, information relating to the size (data size in bytes) of the data block, a data block header, a transaction counter and one or more transactions. The data block header may comprise, for example, a version, a concatenation checksum, a data block checksum, a time stamp, a proof-of-work verification and a nonce (one-off value, random value or counter used for the proof-of-work verification).

In connection with embodiments of the invention, a "blockchain node", "node", "node of a distributed database system" and the like can be understood as meaning, in particular, an apparatus which is coupled, for example, to devices (for example field devices, mobile telephones), computers, smartphones, clients or subscribers, wherein the apparatus carries out the operations with the distributed database system (for example a blockchain). In addition, further nodes of the distributed database system may themselves be devices, computers or the like.

Such nodes may carry out transactions of a distributed database system or of its data blocks, for example, or may insert or concatenate new data blocks with new transactions into the distributed database system by means of new data blocks.

The identification information can provide, in particular, proof which indicates that the corresponding data block was inserted by a particular node or indicates its origin. The devices are, for example, devices of a technical system and/or of an industrial installation and/or of an automation network and/or of a manufacturing installation. In this case, the devices may be, for example, field devices or devices in the Internet of Things.

Such a device is intended to be able to access the data of the distributed database system or to insert data, for example, but the device may be too old, for example, and neither has the necessary cryptographic and/or IT security capabilities and/or computing capacities nor is compatible with the data format of the distributed database system.

An advantage of embodiments of the invention is therefore that the proposed apparatus makes it possible to connect a device to a distributed database system, with the result that device data or corresponding integrity-protecting data references (for example a hash) of the device can be inserted into the distributed database system, for example. Advantageously, the connection is effected, in particular, with a reduced amount of configuration effort and/or a reduced amount of administration effort and/or with improved security conditions. The apparatus may be connected, in particular, to more than one distributed database system, with the result that the device data can be inserted into more than one distributed database system, in particular. It is also conceivable for different parts of the device data to be inserted into different distributed database systems.

The apparatus and/or its modules may be implemented in hardware and/or software. The apparatus is coupled to the device, with the result that the device is supplemented with a functionality which makes it possible to interchange data with the distributed database system. The coupling between the device and the apparatus is carried out via the second communication interface of the apparatus. In embodiments, the device may comprise a corresponding interface in order to make device data available to this second communication interface of the apparatus or to send device data to the latter. The device can therefore be configured as a node of the distributed database system by means of the apparatus. In other words, in embodiments, the apparatus and the device to be connected may be closely coupled using software and/or hardware components, with the result that the apparatus represents the device in the distributed database.

For example, a device may be rendered blockchain-capable by means of the apparatus. Since the apparatus is coupled to the device, there is no need for any further installation and/or configuration process on the device itself in order to connect a device to a preconfigured distributed database. The apparatus is also flexible, in particular, and can be coupled to different devices. There is also no need for a further interface for the device, thus being able to minimize the risk of attacks on the device, for example. The apparatus is configured according to the database configuration information, for example the network identity, in order to make it possible to connect the device to the distributed database. In embodiments, the device data may be inserted into the distributed database system by the data provision module via the first communication interface. Alternatively, the apparatus may comprise a further communication interface which is coupled to the data provision module, with the result that the device data can be inserted into the distributed database system via this further communication interface. The apparatus is therefore independent of different blockchain technologies, in particular.

In one embodiment of the apparatus, the second communication interface may be configured to provide the data provision module with the device data for insertion into the distributed database system.

This has the advantage, in particular, that device data which are intended to be inserted into the distributed database system are provided only by the device. The further processing for inserting the device data into the distributed database is carried out by the apparatus.

In a further embodiment of the apparatus, the configuration module may be configured to configure the data provision module using the at least one selected configuration parameter, such that the data provision module has a configuration suitable for the distributed database system.

In embodiments, the apparatus may be coupled to different types of distributed database systems, for example different blockchain technologies. For this purpose, in embodiments, suitable configuration parameters may be stored in the configuration module in order to adjust the data provision module such that it can interchange data with the distributed database system.

Configuration parameters may be, for example, the following parameters or information: access roles, connection profiles and/or permitted cryptographic methods. In particular, configuration parameters may comprise at least one rule which describes the format in which device data must be provided in order to insert them into the distributed database system.

In a further embodiment of the apparatus, the data provision module may be configured to convert the device data into a database-specific format according to the database configuration information and to insert said data into the distributed database system in this manner.

The device data are therefore changed by the apparatus into a format which is compatible with the distributed database system. A device configuration of the device itself therefore does not need to be changed. For example, the data can be provided in such a manner that they can be inserted as part of a blockchain. For example, the device data may be coupled to a transaction and may thus be inserted into the distributed database system.

In a further embodiment of the apparatus, the identification module may be configured to provide the identification information on the basis of the database configuration information.

The identity of the device and therefore of the apparatus coupled to the latter may therefore be determined for a distributed database system on the basis of the configuration thereof. The identity is coupled, in particular, to access rights of the apparatus or of the device.

In a further embodiment of the apparatus, the first communication interface may be configured to receive data via a network, which is connected to the apparatus and is used to implement the distributed database system, and to detect availability of the distributed database system on the basis of the received data.

Data from the connected network can therefore be taken as a basis for determining whether a distributed database system is available, into which the device can insert device data.

In a further embodiment of the apparatus, the identification module may be configured
 to transmit the identification information to an identification management unit, which is coupled via the network, for the purpose of issuing a certificate on the basis of the identification information, and
 to receive a certificate, which is issued by the identification management unit, for the purpose of registering the apparatus for the distributed database system.

In a further embodiment of the apparatus, the registration module may be configured to register the apparatus on the basis of the certificate.

In embodiments, on the basis of the identification information, a request to issue a certificate may be sent to the identification management unit, for example a certification body, wherein the identification management unit may be assigned to the distributed database system. The identification management unit may issue and/or revoke certificates, in particular, and/or may issue, revoke and/or verify identity information. As soon as the identification management unit has issued, signed and returned a valid certificate for the apparatus on the basis of the identification information, the registration module can register the device for the distributed database. The device consequently has access to the distributed database via the apparatus.

In a further embodiment, the apparatus may comprise a management module which is configured to receive at least one program instruction from the distributed database system on the basis of the identification information, wherein the program instruction comprises at least one rule for inserting device data into the distributed database system, and to provide the data provision module with the program instruction.

In a further embodiment of the apparatus, the data provision module may be configured to insert the device data into the distributed database system according to the rule of the program instruction.

A program instruction may be a smart contract, in particular. The management module may be configured to receive smart contracts and corresponding sets of rules for the apparatus or the device. In particular, the program instruction may be dependent on identification information relating to the device. This ensures that only data for which the device connected to the apparatus has authorization are interchanged with the distributed database system. This also ensures that only the smart contracts which are relevant to the device connected to the apparatus are received.

In a further embodiment of the apparatus, the data provision module may be configured to control the distributed database system on the basis of the registration of the apparatus.

Therefore, as soon as the apparatus has been registered for the distributed database system on the basis of device data, the apparatus can interchange data for the device with the distributed database system or can insert data. In other words, as a result of the registration, the apparatus or the device is configured as a node of the distributed database.

In a further embodiment of the apparatus, the distributed database system may be implemented as a blockchain.

According to a further aspect, embodiments of the invention relate to a computer-implemented method for inserting device data from a device into a distributed database system, comprising the steps of:
  receiving database configuration information relating to a distributed database system,
  receiving device data from the device,
  selecting at least one configuration parameter from a set of stored configuration parameters for configuring a data provision module of an apparatus,
  checking the at least one selected configuration parameter on the basis of the database configuration information and outputting a checking result,
  configuring the data provision module on the basis of the checking result using the at least one selected configuration parameter,
  providing identification information for the apparatus,
  registering the apparatus for the distributed database system on the basis of the identification information, wherein the identification information is dependent on at least some of the device data,
and
  inserting the device data into the distributed database system with reference to the identification information on the basis of the checking result.

Embodiments of the invention also relate to a computer program product (non-transitory computer readable storage medium having instructions, which when executed by a processor, perform actions) which can be directly loaded into a programmable computer, comprising program code parts which, when the program is executed by a computer, cause the latter to carry out the steps of a method according to embodiments of the invention.

A computer program product may be provided or delivered, for example, on a storage medium, for example a memory card, a USB stick, a CD-ROM, a DVD, a non-volatile/non-transitory storage medium or in the form of a downloadable file from a server in a network.

BRIEF DESCRIPTION

Figure 2:
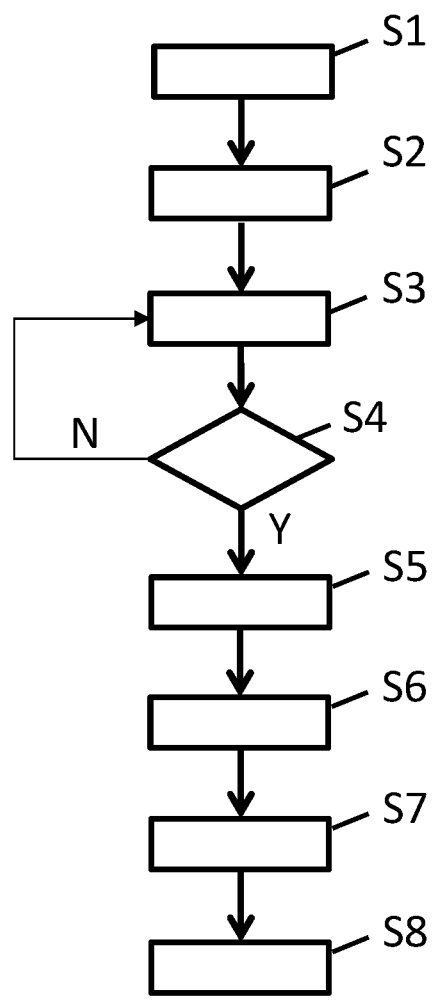

Some of the embodiments will be described in detail, with reference to the following figures, wherein like designations denote like members, wherein:

FIG. 1: shows an exemplary embodiment of an apparatus according to embodiments of the invention for inserting device data from a device into a distributed database system; and FIG. 2: shows an exemplary embodiment of a method according to embodiments of the invention for inserting device data from a device into a distributed database system.

DETAILED DESCRIPTION

Mutually corresponding parts are provided with the same reference signs in all figures.

In particular, the following exemplary embodiments show merely exemplary implementation possibilities, in particular what such implementations of the teaching according to embodiments of the invention could look like, since it is impossible and also not expedient or necessary for the understanding of embodiments of the invention to mention all of these implementation possibilities.

FIG. 1 shows a first exemplary embodiment of the invention. An apparatus 100 according to embodiments of the invention which is coupled to a device FG via a connection K is shown. The apparatus 100 is configured to insert device data D1 from the device FG into a distributed database system. The distributed database system may be, for example, a blockchain BC. The apparatus 100 may couple the device FG to more than one distributed database system, in particular. It is also conceivable for device data or parts of the device data to be inserted into more than one coupled distributed database system by means of the apparatus.

The apparatus 100 may alternatively also be implemented as part of the device FG. For example, the apparatus 100 may be implemented within a protected environment of the device, for example in the secure element of a processor of the device or as a separate chip or as a separate software component of the device.

The device FG may be, for example, a field device, a manufacturing device, a sensor, a programmable logic controller (PLC), a programmable automation controller (PAC) or a medical device. In particular, the device FG may not have any functionality for inserting the device data D1 into a distributed database system.

FIG. 1 also shows a network NW which is used to connect a plurality of devices. The blockchain BC is implemented using this network infrastructure NW. Nodes BCN of the blockchain are shown. The nodes BCN are further devices, for example. In embodiments, the blockchain may comprise a multiplicity of nodes BCN. The apparatus 100 makes it possible to insert device data from the device FG into the blockchain BC, that is to say, in particular, one or more transactions or a data block with its transactions is/are transmitted to one or more nodes BCN of the blockchain BC. If such a transaction is successfully validated, for example by one of the nodes BCN, this transaction can be stored as a new data block with at least one existing data block of the blockchain BC.

The apparatus 100 is connected to the distributed database system via a communication connection C, with the result that data can be interchanged. The apparatus comprises a first communication interface 101 which is configured to receive data via the communication connection C the network NW and to detect availability of a blockchain or of another distributed database system on the basis of the received data. The first communication interface 101 is also configured to receive database configuration information D2 or to derive said information from the received data as soon as a distributed database system, for example the blockchain BC, has been detected. The database configuration information comprises, in particular, information relating to the technology type of the detected blockchain BC. Database configuration information may also be, in particular, information relating to a genesis block, a boot node, peer information, or smart contract addresses. The apparatus 100 may therefore detect, in particular, more than one distributed database system or different distributed database systems, may be coupled thereto and may insert device data from the device.

The apparatus 100 also comprises a second communication interface 102 which is coupled to the device FG via the wireless or wired connection K. If the apparatus 100 is implemented as part of the device FG, the connection K may also be a data bus, in particular. The second communication interface 102 is configured to receive device data D1 from the device via the connection K. Device data may be, in particular, the original data from the device, data derived from the device data or processed data, for example averaged or selected data.

The apparatus 100 also comprises a configuration module 103 and a data provision module 106. The configuration module 103 is configured to configure the data provision module 106. For this purpose, the configuration module 103 is configured to select at least one configuration parameter from a set of configuration parameters stored in the configuration module 103 for configuring the data provision module 106.

A multiplicity of configuration parameters which each make it possible to connect the apparatus 100 to a distributed database system may be stored in the configuration module 103 in embodiments. The at least one selected configuration parameter is checked by means of a checking unit of the configuration module on the basis of the received database configuration information D2. A check is carried out, in particular, in order to determine whether the at least one selected configuration parameter is configured to configure the data provision module 106 in such a manner that it has a configuration suitable for the detected blockchain BC. In other words, a search is carried out for at least one configuration parameter, matching the configuration of the blockchain BC or of the corresponding distributed database system, for the data provision unit 106. If the check reveals a positive checking result, that is to say if the at least one selected configuration parameter matches the configuration of the blockchain BC, the data provision module is configured therewith, with the result that it has a configuration suitable for connection to the blockchain BC. If the checking result is negative, at least one further configuration parameter can be selected and checked. A suitable configuration can therefore be iteratively determined for the data provision module 106.

The apparatus also comprises an identification module 104 which is configured to provide identification information ID for the apparatus 100. The identification information ID is, in particular, dependent on at least some of the device data D1. For example, some of the device data may comprise device-specific identification data relating to the device. The identification information ID of the apparatus 100 is therefore linked to the device identity. The identification module 104 may be configured, in particular, to also generate and provide the identification information ID on the basis of the received database configuration information D2. The apparatus 100 may therefore be additionally identified on the basis of a distributed database system.

The identification module 104 may be configured, in particular, to transmit the generated identification information ID to an identification management unit CA coupled via the network NW. An identification management unit CA may be understood as meaning a provision apparatus for providing and verifying an identity. An identification management unit can be understood as meaning, in particular, a certification body. In other words, the identification management unit CA may be configured, for example, to provide an identity for a device or an apparatus, that is to say to register or enroll the device or the apparatus for the distributed database system.

In embodiments, the identification management unit CA may be part of the blockchain and is configured to issue and/or revoke certificates which are suitable for registering a device for the blockchain BC. The identification management unit CA can therefore issue a certificate CERT for the apparatus 100 on the basis of the identification information ID and can transmit it back to the identification module 104. The apparatus 100 also comprises a registration module 105 which registers the apparatus 100 for the distributed database system on the basis of the identification information ID. In particular, the registration module 105 can register the apparatus by means of the certificate CERT.

As soon as the apparatus 100 has been registered for the blockchain BC, that is to say on the basis of a successful registration of the apparatus 100 by the registration module 105, device data D1 can be inserted into the blockchain with reference to the identification information ID by means of the data provision module 106. For example, the device data may be concatenated with a block of the blockchain BC. The device data D1 are integrity-protected, in particular, by the reference to the identification information ID. For example, the identification information ID is assigned or added to the device data D1.

In embodiments, the data provision module 106 may be connected to the second communication interface 102, with the result that it can receive the device data D1 from there. In embodiments, the data provision module 106 may be configured to convert the device data D1 into a database-specific format, for example coupled to a transaction, according to the database configuration information D2 and to insert said data into the blockchain BC in this manner. In embodiments, the data provision module 106 may be connected to the first communication interface 101, with the result that the device data D1 can also be inserted into the blockchain via this first communication interface 101. In addition, the data provision module 106 can implement cryptographic protection, for example by means of a checksum, for the transaction or the device data.

The apparatus 100 may also comprise a management module 107 which is configured to receive at least one program instruction from the blockchain BC on the basis of the identification information ID. The program instruction may be, in particular, a smart contract which comprises at least one rule for inserting device data into the blockchain BC. In embodiments, the management module 107 may be coupled to the data provision module 106 and provides the latter with the received program instruction. The data provision module 106 can therefore insert the device data D1 into the blockchain on the basis of the program instruction. In other words, the management module receives rules, for example smart contracts, on the basis of the identification information ID assigned to the device FG, wherein the rules control the interchange of data with the blockchain. The received program instructions are linked to the node identity ID in order to receive, in particular, only program instructions which are suitable for the device FG. For example, the device FG may be a temperature sensor which is assigned only a smart contract relating to temperature measurement.

The modules of the apparatus 100 are advantageously connected to one another, in particular, with the result that they can interchange information or data with one another.

FIG. 2 shows a second exemplary embodiment of the invention as a flowchart. Steps of a method according to embodiments of the invention for inserting device data D1 from a device into a distributed database system are shown. The method can be carried out by means of an apparatus according to embodiments of the invention, as explained using FIG. 1, for example.

In the first step S1, database configuration information relating to a distributed database system is received via a network coupled to the apparatus. In embodiments, a network request (ping) may be previously sent by the apparatus to further devices of the network in order to check availability of a distributed database system. As soon as they receive the request, the further devices may verify the apparatus and provide access to the distributed database system.

In the next step S2, device data are received from the device. In some embodiments, it may be that only device data which are intended to be provided for the distributed database system are received.

In the next step S3, at least one configuration parameter for configuring a data provision module of the apparatus is selected from a set of stored configuration parameters. Then, in step S4, the at least one selected configuration parameter is checked on the basis of the database configuration information, that is to say a compatibility check of the at least one configuration parameter is carried out, for example, on the basis of the configuration of the distributed database system, and the checking result is output. In the case of a positive checking result Y, the database provision module is configured using the at least one selected configuration parameter as the next step S5. In the case of a negative checking result N, the selection step S3 is repeated until at least one suitable configuration parameter is found. If no suitable configuration parameter is found, the configuration process and/or the registration process, steps S6 and S7, is/are aborted or not carried out. In this case, an error message can be output, for example.

In step S6, identification information is generated for the apparatus, wherein the identification information is dependent on at least some of the device data. The apparatus is registered for the distributed database system in step S7 on the basis of the identification information.

As soon as the data provision module has been configured and the apparatus has been registered for the distributed database system, the device data are inserted into the distributed database system with reference to the identification information in step S8. For example, the identification information is assigned to the device data, with the result that the device data inserted into the distributed database system can be uniquely assigned to the device. The insertion of the device data can be controlled in this case, in particular, on the basis of smart contracts which may be received from the distributed database system on the basis of the identification information in embodiments.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The claims are as follows:

1. An apparatus for inserting device data from a device into a distributed ledger system, comprising:
    a first communication interface configured to receive database configuration information from the distributed ledger system,
    a second communication interface coupled to the device and configured to receive the device data from the device,
    a plurality of modules including at least one hardware processor and at least one storage unit for storing program code, the plurality of modules including a configuration module, an identification module, a registration module, a data provision module, and a management module,
    wherein the configuration module is configured
        to select at least one configuration parameter from a set of configuration parameters stored in the configuration module for configuring a data provision module of the apparatus,
        to check the at least one selected configuration parameter on the basis of the database configuration information and to output a checking result, and
        on the basis of the checking result, to configure the data provision module using the at least one selected configuration parameter,
    wherein the identification module is configured
        to provide identification information for the apparatus, wherein the identification information is dependent on at least some of the device data,
        to transmit the identification information to an identification management unit coupled via a network, for the purpose of issuing a certificate on the basis of the identification information, and
        to receive the certificate issued by the identification management unit, for the purpose of registering the apparatus for a distributed database system,
    wherein the registration module is configured to register the apparatus for the distributed database system on the basis of the identification information and the certificate, and wherein the data provision module is configured, on the basis of the checking result, to insert the device data into the distributed ledger system with reference to the identification information, wherein the apparatus is located between the device and the distributed ledger system, wherein a coupling between the device and the apparatus is carried out via the second communication interface over a wired or wireless connection or over a data bus, and wherein the first communication interface of the apparatus is connected to the distributed database system via a communication connection, wherein the management module is configured to receive at least one smart contract from the distributed ledger system on the basis of the identification information, wherein the at least one smart contract comprises at least one rule for inserting the device data into the distributed ledger system, and to provide the data provision module with the at least one smart contract.

2. The apparatus as claimed in claim 1, wherein the second communication interface is configured to provide the data provision module with the device data for insertion into the distributed ledger system.

3. The apparatus as claimed in claim 1, wherein the configuration module is configured to configure the data provision module using the at least one selected configuration parameter, such that the data provision module has a configuration suitable for the distributed ledger system.

4. The apparatus as claimed in claim 1, wherein the data provision module is configured to convert the device data into a database-specific format according to the database configuration information and to insert the device data into the distributed ledger system in this manner.

5. The apparatus as claimed in claim 1, wherein the identification module is configured to provide the identification information on the basis of the database configuration information.

6. The apparatus as claimed in claim 1, wherein the first communication interface is configured to receive data via a network, which is connected to the apparatus and is used to implement the distributed ledger system, and to detect availability of the distributed ledger system on the basis of the received data.

7. The apparatus as claimed in claim 1, wherein the data provision module is configured to insert the device data into the distributed ledger system according to the rule of the at least one smart contract.

8. The apparatus as claimed in claim 1, wherein the data provision module is configured to control the distributed ledger system on the basis of the registration of the apparatus.

9. The apparatus as claimed in claim 1, wherein the distributed ledger system is implemented as a blockchain.

10. A computer-implemented method for inserting device data from a device into a distributed ledger system, comprising the steps of:
receiving database configuration information relating to a distributed ledger system,
receiving the device data from the device,
selecting at least one configuration parameter from a set of stored configuration parameters for configuring a data provision module of an apparatus,
checking the at least one selected configuration parameter on the basis of the database configuration information and outputting a checking result,
configuring the data provision module on the basis of the checking result using the at least one selected configuration parameter,
providing identification information for the apparatus, wherein the identification information is dependent on at least some of the device data,
registering the apparatus for the distributed ledger system on the basis of the identification information,
transmitting the identification information to an identification management unit coupled via a network, for the purpose of issuing a certificate on the basis of the identification information,
receiving the certificate issued by the identification management unit, for the purpose of registering the apparatus for the distributed ledger system,
registering the apparatus on the basis of the identification information and the certificate,
receiving at least one smart contract on the basis of the identification information, wherein the at least one smart contract comprises at least one rule for inserting the device data into the distributed ledger system, and providing the data provision module with the at least one smart contract, and
inserting the device data into the distributed ledger system with reference to the identification information on the basis of the checking result,
wherein the apparatus is located between the device and the distributed ledger system,
wherein a coupling between the device and the apparatus is carried out via the second communication interface over a wired or wireless connection, and
wherein the first communication interface of the apparatus is connected to the distributed database system via a communication connection.

11. The computer-implemented method of claim 10, wherein the device is selected from the group consisting of a field device, a manufacturing device, a sensor, a programmable logic controller (PLC), a programmable automation controller (PAC), and a medical device.

12. A computer program product, comprising a computer readable hardware storage device having computer readable program code stored therein, said program code executable by a processor of a computer system to implement a method for inserting device data from a device into a distributed ledger system, the method comprising the steps of:
receiving database configuration information relating to a distributed ledger system,
receiving the device data from the device,
selecting at least one configuration parameter from a set of stored configuration parameters for configuring a data provision module of an apparatus,
checking the at least one selected configuration parameter on the basis of the database configuration information and outputting a checking result,
configuring the data provision module on the basis of the checking result using the at least one selected configuration parameter,
providing identification information for the apparatus, wherein the identification information is dependent on at least some of the device data,
registering the apparatus for the distributed ledger system on the basis of the identification information,
receiving at least one smart contract on the basis of the identification information, wherein the at least one smart contract comprises at least one rule for inserting the device data into the distributed ledger system, and providing the data provision module with the at least one smart contract, and inserting the device data into the distributed ledger system with reference to the identification information on the basis of the checking result, wherein the apparatus is located between the device and the distributed ledger system, wherein a coupling between the device and the apparatus is carried out via the second communication interface over a wired or wireless connection, and wherein the first communication interface of the apparatus is connected to the distributed database system via a communication connection.

13. The apparatus of claim 1, wherein the device is selected from the group consisting of a field device, a manufacturing device, a sensor, a programmable logic controller (PLC), a programmable automation controller (PAC), and a medical device.

14. The computer program product of claim 12, wherein the device is selected from the group consisting of a field device, a manufacturing device, a sensor, a programmable logic controller (PLC), a programmable automation controller (PAC), and a medical device.

* * * * *